United States Patent
Nasu (10) Patent No.: US 10,839,288 B2
(45) Date of Patent: Nov. 17, 2020

(54) TRAINING DEVICE, SPEECH DETECTION DEVICE, TRAINING METHOD, AND COMPUTER PROGRAM PRODUCT

(71) Applicant: Kabushiki Kaisha Toshiba, Minato-ku (JP)

(72) Inventor: Yu Nasu, Meguro (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 1015 days.

(21) Appl. No.: 15/257,463

(22) Filed: Sep. 6, 2016

(65) Prior Publication Data

US 2017/0076200 A1 Mar. 16, 2017

(30) Foreign Application Priority Data

Sep. 15, 2015 (JP) ................................. 2015-182167

(51) Int. Cl.
  *G06N 3/04* (2006.01)

(52) U.S. Cl.
  CPC .................................. *G06N 3/0472* (2013.01)

(58) Field of Classification Search
  CPC ........................... G06N 3/0472; A61B 5/04008
  See application file for complete search history.

(56) References Cited

U.S. PATENT DOCUMENTS 5,317,673 A * 5/1994 Cohen .................... G10L 15/144
  704/232
5,893,058 A * 4/1999 Kosaka .................... G10L 15/12
  704/254

2004/0167778 A1 * 8/2004 Valsan .................... G10L 15/16
  704/231

(Continued)

FOREIGN PATENT DOCUMENTS

| JP | 10-198645 A | 7/1998 |
|---|---|---|
| JP | 2015-095212 A | 5/2015 |

OTHER PUBLICATIONS

'Elements of artificial neural networks': Mehrotra, 1997 MIOT press.*

(Continued)

*Primary Examiner* — Li B. Zhen
*Assistant Examiner* — Peter Coughlan
(74) *Attorney, Agent, or Firm* — Oblon, McClelland, Maier & Neustadt, L.L.P.

(57) ABSTRACT

According to an embodiment, a training device trains a neural network that outputs a posterior probability that an input signal belongs to a particular class. An output layer of the neural network includes N units respectively corresponding to classes and one additional unit. The training device includes a propagator, a probability calculator, and an updater. The propagator supplies a sample signal to the neural network and acquires (N+1) input values for each unit at the output layer. The probability calculator supplies the input values to a function to generate a probability vector including (N+1) probability values respectively corresponding to the units at the output layer. The updater updates a parameter included in the neural network in such a manner to reduce an error between a teacher vector including (N+1) target values and the probability vector. A target value corresponding to the additional unit is a predetermined constant value.

15 Claims, 4 Drawing Sheets

(56) References Cited

U.S. PATENT DOCUMENTS

2005/0091050 A1\* 4/2005 Surendran .......... G06K 9/00536
704/226
2014/0046696 A1\* 2/2014 Higgins .............. G06F 19/3456
705/3
2015/0134578 A1 5/2015 Tamatsu et al.

OTHER PUBLICATIONS

'A New Error Criterion for Posterior Probability Estimation With Neural Nets' El-Jaroudi, 1990, IEEE.\*
J. Devlin, et al., "Fast and Robust Neurai Network Joint Models for Statistics Machine Translation" Proceedings of the 52$^{nd}$ Annual Meeting of the Association for Computational Linguistics, 2014, pp. 1370-1380.

\* cited by examiner

TRAINING DEVICE, SPEECH DETECTION DEVICE, TRAINING METHOD, AND COMPUTER PROGRAM PRODUCT

CROSS-REFERENCE TO RELATED APPLICATIONS

This application is based upon and claims the benefit of priority from Japanese Patent Application No. 2015-182167, filed on Sep. 15, 2015; the entire contents of which are incorporated herein by reference.

FIELD

An embodiment described herein relates generally to a training device, a speech detection device, a training method, and a computer program product.

BACKGROUND

Neural networks that perform classification are known. Such neural networks output posterior probabilities that an input signal belongs to respective classes.

Pattern detection devices are also known that detect a part of an input signal similar to a particular search pattern from the input signal. A pattern detection device detects, for example, a particular keyword such as "hello" from a speech signal. The neural network that performs classification can be used in such a pattern detection device.

When used in the pattern detection device, the neural network only needs to output the posterior probabilities of classes related to the search pattern, and does not need to output the posterior probabilities of all classes. For example, in the case of classifying the speech signal by using phonemic parameters for which triphones are used that take into account connections with phonemes before and after a phoneme, the number of all classes reaches several thousand. By contrast, for example, posterior probabilities of roughly several to several tens of classes are required to detect a word, such as "hello". Accordingly, in such a case, the neural network only needs to output posterior probabilities of roughly several to several tens of classes.

The neural network that performs classification uses a softmax function as an activation function for an output layer. Unlike a sigmoid function that is used for an input layer and a hidden layer or layers, the softmax function needs to determine an output value of one unit based on input values corresponding to all units.

Consequently, although the neural network used in the pattern detection device only needs to output a posterior probability for a particular class, the neural network needs to calculate the input values corresponding to all the units. This increases computational cost at the output layer of the neural network used in the pattern detection device as described above.

DETAILED DESCRIPTION

According to an embodiment, a training device trains a neural network that outputs a posterior probability that an input signal belongs to a particular class. An output layer of the neural network includes N units (N is an integer of 2 or larger) respectively corresponding to classes and one additional unit. The device includes a propagator, a probability calculator, and an updater. The propagator supplies a sample signal to the neural network and acquires, for each of the units at the output layer, (N+1) input values that are obtained by connecting signals output from a layer immediately preceding the output layer according to a set parameter. The probability calculator supplies the input values to a function for calculating the posterior probability to generate a probability vector including (N+1) probability values respectively corresponding to the units at the output layer. The updater updates the parameter included in the neural network in such a manner to reduce an error between a teacher vector and the probability vector.

The teacher vector includes (N+1) target values respectively corresponding to the units at the output layer. A target value corresponding to the additional unit is a predetermined constant value.

An embodiment will be described below in detail with reference to the drawings.

Figure 1:
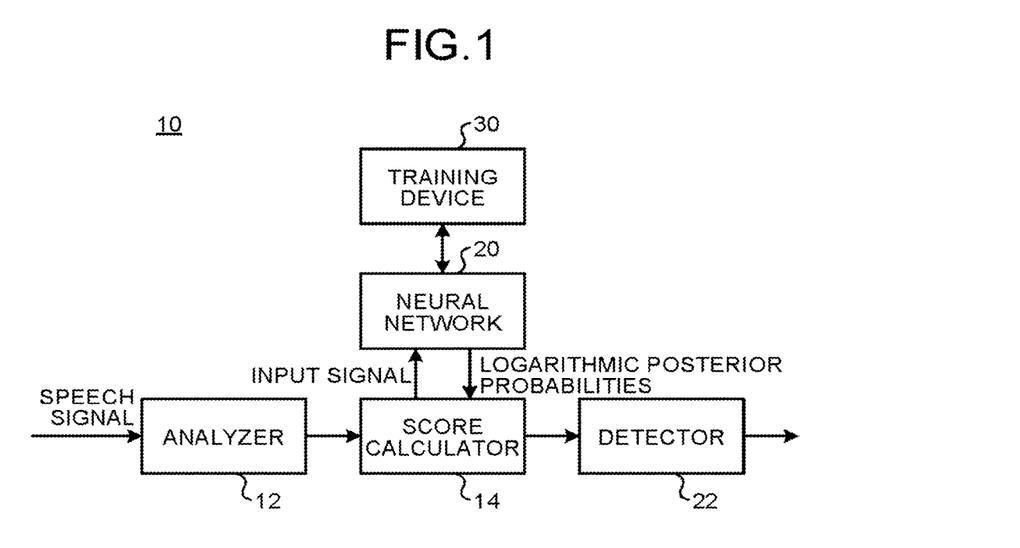
FIG. 1 is a configuration diagram of a speech detection device according to an embodiment.

FIG. 1 is a diagram illustrating a configuration of a speech detection device 10 according to the embodiment. The speech detection device 10 detects, from a speech signal, a part of the speech signal similar to a specified search pattern. For example, the speech detection device 10 detects a particular keyword, such as "hello", from the speech signal.

The speech detection device 10 includes an analyzer 12, a score calculator 14, a neural network 20, a detector 22, and a training device 30.

The analyzer 12 receives a speech signal, converts the received speech signal into a sequence of parameters representing acoustic characteristics of the voice, and outputs the sequence of parameters. For example, the analyzer 12 outputs a speech parameter sequence of mel-frequency cepstral coefficients (MFCCs) at intervals of a certain period. The analyzer 12 may continuously output the speech parameter sequence from the start until the end of the input of the signal, or may successively output the speech parameter sequence. The analyzer 12 may temporarily store all such signals, and analyze the signals off-line to output the speech parameter sequence, or may alternatively analyze the received signal in real time to output the speech parameter sequence.

The score calculator 14 calculates a score representing likelihood of occurrence of each speech parameter included in the speech parameter sequence in the search pattern. More specifically, the score calculator 14 supplies the speech parameter to the neural network 20, acquires, from the neural network 20, a posterior probability that the supplied speech parameter belongs to a particular class, and outputs the acquired posterior probability as the score. In the present embodiment, the score calculator 14 acquires a natural logarithm of the posterior probability (logarithmic posterior probability) from the neural network 20.

The neural network 20 acquires the speech parameters as an input signal from the analyzer 12. The neural network 20 outputs the logarithmic posterior probability that the input signal belongs to the particular class among N classes (N is an integer of 2 or larger). In the present embodiment, one or more of such particular classes belongs or belong to the search pattern.

The neural network 20 does not output any logarithmic posterior probabilities (for example, outputs zero or a minimum value) for classes other than the particular classes.

For example, in the case of detecting a keyword such as "hello" from the speech signal, if the input signal represents speech parameters represented by triphones, the neural network 20 outputs the logarithmic posterior probabilities for roughly several to several tens of classes, and does not output any logarithmic posterior probabilities for the other classes.

The detector 22 detects, based on the scores calculated by the score calculator 14, whether the speech signal includes the search pattern. More specifically, the detector 22 calculates a degree of similarity between a partial sequence in the speech parameter sequence and the search pattern, and, if the calculated degree of similarity exceeds a preset threshold, determines that the partial sequence is similar to the search pattern. For example, the degree of similarity between the partial sequence and the search pattern is represented by a cumulative score obtained by accumulating all the scores included in the partial sequence. For example, if the search pattern is a hidden Markov model (HMM), the detector 22 uses a matching algorithm, such as a dynamic programming algorithm, to determine, for each path of the HMM, whether the partial sequence is similar to the search pattern.

If the speech signal is determined to include the search pattern, the detector 22 externally outputs, for example, a flag. Thereby, the speech detection device 10 can externally notify that the part similar to the specified search pattern has been detected.

Figure 2:
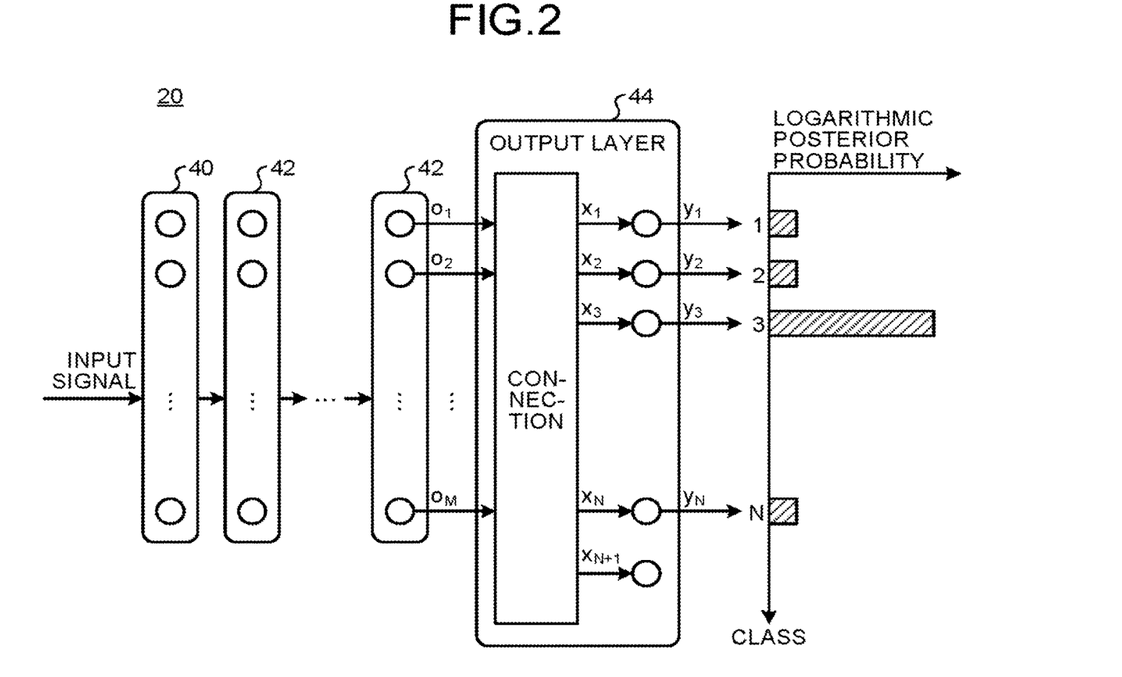
FIG. 2 is a diagram for explaining layers of a neural network.

FIG. 2 is a diagram for explaining layers of the neural network 20. The neural network 20 includes a plurality of layers connected in series, and transfers a vector between layers. In the case of a feedforward neural network, the neural network 20 includes an input layer 40, one or more hidden layers 42, and an output layer 44. The neural network 20 may have a configuration that does not include the hidden layers 42. The neural network 20 propagates the input signal in the forward direction from the input layer 40, and outputs N output values $y_1, y_2, \ldots, y_N$ respectively corresponding to the N classes from the output layer 44. Each of the output values $y_1, y_2, \ldots, y_N$ represents an estimated value of the posterior probability that the input signal belongs to corresponding one of the N classes.

The output layer 44 includes N units respectively corresponding to the N classes and one additional unit. The output layer 44 acquires a vector including M elements $o_1, o_2, \ldots, o_M$ (M is an integer of 1 or larger) from the immediately preceding layer. The output layer 44 subsequently connects the M elements $o_1, o_2, \ldots, o_M$ based on preset parameters to generate (N+1) input values $x_1, x_2, \ldots, x_N, x_{N+1}$ corresponding to the respective (N+1) units. The output layer 44 then gives a predefined function the (N+1) input values $x_1, x_2, \ldots, x_N, x_{N+1}$ to output the N output values $y_1, y_2, \ldots, y_N$ respectively corresponding to the N classes.

Specifically, the output layer 44 performs calculation represented by Expressions (11) and (12) given below. The overlines drawn over variables indicate that the variables are vectors. The symbol f( ) represents a function used in the output layer 44.

$$\bar{y} = f(\bar{x}) \quad (11)$$

$$\bar{x} = \overline{W}\bar{o} + \bar{b} \quad (12)$$

A vector x is represented by Expression (13) below. A vector y is represented by Expression (14) below.

$$\bar{x} = \begin{bmatrix} x_1 \\ x_2 \\ x_3 \\ \vdots \\ x_N \\ x_{N+1} \end{bmatrix} \quad (13)$$

$$\bar{y} = \begin{bmatrix} y_1 \\ y_2 \\ y_3 \\ \vdots \\ y_N \end{bmatrix} \quad (14)$$

Of the values of indices indicating the positions of the elements included in the vectors x and y, values from 1 to N represent numbers for the units corresponding to the N classes. Accordingly, $x_c$ (c is an integer of 1 to N) represents an input value corresponding to a unit for a c-th class, and $y_c$ represents an output value corresponding to the unit for the c-th class. Of the values of indices of the elements included in the vectors x and y, the value (N+1) represents the number for the additional unit. Accordingly, $x_{N+1}$ represents an input value corresponding to the additional unit.

A vector o is represented by Expression (15) below.

$$\bar{o} = \begin{bmatrix} o_1 \\ o_2 \\ o_3 \\ \vdots \\ o_M \end{bmatrix} \quad (15)$$

The indices indicating the positions of the elements included in the vector o represent numbers for units at a layer immediately preceding the output layer 44.

A two-dimensional matrix W and a vector b are represented by Expressions (16) and (17) given below.

$$W = \begin{bmatrix} w_{1,1} & \cdots & w_{1,M} \\ \vdots & \ddots & \vdots \\ w_{(N+1),1} & \cdots & w_{(N+1),M} \end{bmatrix} \quad (16)$$

$$\bar{b} = \begin{bmatrix} b_1 \\ b_2 \\ b_3 \\ \vdots \\ b_{N+1} \end{bmatrix} \quad (17)$$

The matrix W consists of parameters representing weights of connections set for the respective units. The vector b consists of parameters representing biases set for the respective units. These parameters are updated by training. More in detail, each element $w_{i,j}$ of the matrix W represents a weight to be multiplied by a value transferred from a j-th unit at the layer immediately preceding the output layer 44 to an i-th unit at the output layer 44. An element $b_i$ of the vector b represents a bias set for the i-th unit at the output layer 44.

The input value $x_c$ corresponding to the unit for the c-th class is represented by Expression (18) below.

$$x_c = [w_{c,1}, w_{c,2}, w_{c,3}, \ldots, w_{c,M}] \begin{bmatrix} o_1 \\ o_2 \\ o_3 \\ \vdots \\ o_M \end{bmatrix} + b_c \quad (1 \le c \le N+1) \quad (18)$$

In the present embodiment, the function used at the output layer 44 is represented by Expression (21) below.

$$\bar{y} = f(\bar{x}) = \begin{bmatrix} x_1 - x_{N+1} \\ x_2 - x_{N+1} \\ x_3 - x_{N+1} \\ \vdots \\ x_N - x_{N+1} \end{bmatrix} \quad (21)$$

Accordingly, the output value $y_c$ corresponding to the unit for the c-th class is a value obtained by subtracting the input value $x_{N+1}$ corresponding to the additional unit from the input value $x_c$ corresponding to the unit for the c-th class.

The output value $y_c$ represents an estimated value of a logarithmic posterior probability (log p(c|o)) that the input signal of the neural network 20 belongs to the c-th class.

The neural network 20 according to the present embodiment uses the function described above at the output layer 44, and hence, only needs to calculate the input value $x_c$ corresponding to the unit for the c-th class and the input value $x_{N+1}$ to the additional unit in order to calculate the logarithmic posterior probability of the c-th class. Consequently, unlike in the case of using a softmax function, the neural network 20 does not need to perform calculation using all the input values to calculate the logarithmic posterior probability of the c-th class. Thus, the computational cost can be reduced.

For example, in the case of detecting a particular keyword portion, such as "hello", from the speech signal, the neural network 20 only needs to output the logarithmic posterior probabilities of roughly several to several tens of classes among several thousand classes. Consequently, the neural network 20 does not need to calculate the logarithmic posterior probabilities of most of the several thousand classes, so that the computational cost can be significantly reduced.

In an actual operation, the neural network 20 only needs to carry out functions of units necessary to calculate the logarithmic posterior probabilities, and may stop functions of the other units (units not used for calculating the logarithmic posterior probabilities). That is, the neural network 20 only needs to carry out the functions of units corresponding to the particular classes and the additional unit at the output layer 44, and may stop the functions of units corresponding to the classes other than the particular classes at the output layer 44.

Description will be made later in detail of the reason why the neural network 20 can calculate the logarithmic posterior probabilities corresponding to the respective classes using the function given above.

Figure 3:
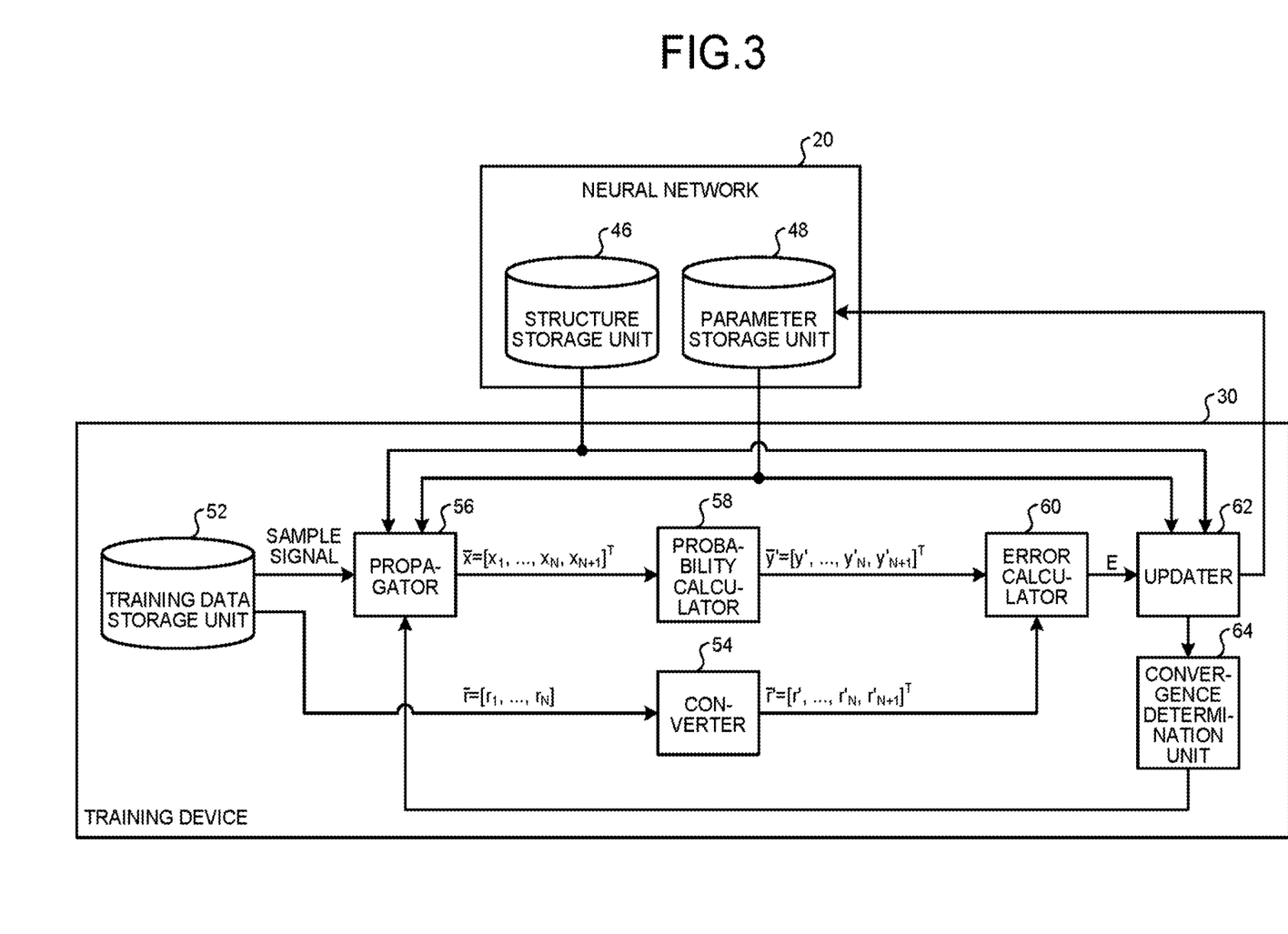
FIG. 3 is a diagram illustrating a functional configuration of a training device.

FIG. 3 is a diagram illustrating the functional configuration of the training device 30, together with that of the neural network 20.

The neural network 20 includes a structure storage unit 46 and a parameter storage unit 48. The structure storage unit 46 stores structural information representing the layered structure of the neural network 20 and interlayer connection relations of the units thereof. The parameter storage unit 48 stores parameters for connection that are used for connecting elements of a vector output from the immediately preceding layer to generate a vector of the subsequent layer including input values thereto, on a layer-by-layer basis. In the present embodiment, the neural network 20 stores, for each of the layers, parameters representing a weight matrix of connections set for the respective units and parameters representing biases set for the respective units.

The training device 30 trains the parameters for connection stored in the neural network 20. In the present embodiment, the training device 30 trains the parameters stored in the parameter storage unit 48 of the neural network 20.

The training device 30 includes a training data storage unit 52, a converter 54, a propagator 56, a probability calculator 58, an error calculator 60, an updater 62, and a convergence determination unit 64.

The training data storage unit 52 stores a set of a sample signal to be supplied to the neural network 20 and a pre-conversion teacher vector. The training data storage unit 52 may store a plurality of such sets of the sample signal and the pre-conversion teacher vector.

The sample signal is an example of the input signal that is known in advance to belong to the particular classes among the N classes. The pre-conversion teacher vector is a vector that includes, as elements thereof, N target values $r_1$, $r_2$, ..., $r_N$ to be output from the neural network 20 when the corresponding sample signal is classified.

In the present embodiment, the pre-conversion teacher vector is represented as a vector obtained by 1-of-k encoding. That is, if the sample signal belongs to the c-th class, the pre-conversion teacher vector is represented by Expression (31) below.

$$\bar{r} = [r_1, r_2, \ldots, r_c, \ldots, r_N]^T \quad (31)$$
$$= [0, 0, \ldots, 1, \ldots, 0]^T$$

That is, the pre-conversion teacher vector is a vector in which a target value $r_c$ corresponding to a correct answer class is 1, and all target values corresponding to the other classes are 0.

The converter 54 converts the pre-conversion teacher vector including the N target values $r_1$, $r_2$, ..., $r_N$ into a teacher vector including (N+1) target values r'1, r'$_2$, ..., r'$_N$, r'$_{N+1}$. Specifically, the converter 54 adds an element corresponding to the additional unit to the pre-conversion teacher vector. The converter 54 then sets an element corresponding to the correct answer class to ½. The converter 54 further sets the element corresponding to the additional unit to a constant value of ½.

The teacher vector is specifically represented by Expression (32) below.

$$\bar{r}' = [r'_1, r'_2, \ldots, r'_c, \ldots, r'_N, r'_{N+1}]^T \quad (32)$$
$$= \left[\frac{1}{2}r_1, \frac{1}{2}r_2, \ldots, \frac{1}{2}r_c, \ldots, \frac{1}{2}r_N, \frac{1}{2}\right]^T$$
$$= \left[0, 0, \ldots, \frac{1}{2}, \ldots, 0, \frac{1}{2}\right]^T$$

In the teacher vector described above, the target value corresponding to each of the classes is a value based on the probability that the sample signal belongs to the class, and the target value $r'_{N+1}$ corresponding to the additional unit is a predetermined constant value.

More specifically, in the teacher vector, each of the target values is 0 or larger, and the sum of all the target values is 1. Furthermore, in the teacher vector, the target value $r'_c$ corresponding to the correct answer class is ½, the target value $r'_{N+1}$ corresponding to the additional unit is ½, and the other target values are 0.

The training data storage unit 52 may store a set of the converted teacher vector and the sample signal, instead of the pre-conversion teacher vector. In this case, the training device 30 has a configuration that does not include the converter 54.

The propagator 56 acquires the structural information and the parameters of the neural network 20, and propagates the sample signal in the forward direction from the input layer of the neural network 20. The propagator 56 acquires, for each of the units at the output layer 44, the (N+1) input values $x_1, x_2, \ldots, x_N, x_{N+1}$ that are obtained by connecting the signals output from the immediately preceding layer according to the preset parameters. The propagator 56 then outputs an input vector including the (N+1) input values $x_1, x_2, \ldots, x_N, x_{N+1}$ as represented by Expression (33) below.

$$\bar{x} = [x_1, x_2, \ldots, x_N, r_{N+1}]^T \quad (33)$$

The probability calculator 58 acquires the input vector from the propagator 56. The probability calculator 58 supplies the respective input values to a function for calculating the posterior probabilities to generate a probability vector including (N+1) probability values $y'_1, y'_2, \ldots, y'_N, y'_{N+1}$ respectively corresponding to the units at the output layer 44. In the present embodiment, the probability calculator 58 supplies the respective input values $x_1, x_2, \ldots, x_N, x_{N+1}$ to the softmax function to generate the (N+1) probability values $y'_1, y'_2, \ldots, y'_N, y'_{N+1}$. Specifically, the probability calculator 58 performs calculation as represented by Expression (34) below to calculate the i-th probability value $y'_i$.

$$y'_i = \text{softmax}(x_i) \quad (1 \le i \le N+1) \quad (34)$$
$$= \frac{\exp x_i}{Z(x)}$$
$$Z(x) = \sum_{j=1}^{N+1} \exp x_j \quad (1 \le j \le N+1)$$

The probability calculator 58 outputs the probability vector as represented by Expression (35) below.

$$\bar{y}' = [Y'_1, Y'_2, \ldots, y'_N, y'_{N+1}]^T \quad (35)$$

The error calculator 60 calculates an error E between the teacher vector including the (N+1) target values $r'_1, r'_2, \ldots, r'_N, r'_{N+1}$ and the probability vector including the (N+1) probability values $y'_1, y'_2, \ldots, y'_N, y'_{N+1}$. In the present embodiment, the error calculator 60 calculates a cross-entropy error. Specifically, the error calculator 60 performs calculation as represented by Expression (36) below to calculate the error E.

$$E = H(\bar{r}', \bar{y}') \quad (36)$$
$$H(\bar{r}', \bar{y}') = -\sum_{i=1}^{N+1} r'_i \log y'_i$$

The updater 62 updates the parameters included in the neural network 20 in such a manner to reduce the error E calculated by the error calculator 60. Specifically, the updater 62 updates the parameters stored in the parameter storage unit 48, including those representing the weight vector of connections set for the respective units and those representing the biases set for the respective units.

In the present embodiment, the updater 62 uses an error back-propagation method to update the parameters. That is, the updater 62 propagates the error E in the reverse direction from the output layer 44 of the neural network 20 to update the parameters at the respective layers so as to reduce the error E. The updater 62 may use any other method to update the parameters.

The convergence determination unit 64 determines whether the updated parameters have converged as a result of the update of the parameters by the updater 62. If they are determined to have converged, the convergence determination unit 64 ends the current training using the sample signal and the teacher vector. If they are not determined to have converged, the convergence determination unit 64 returns execution the process to the propagator 56. If the process is returned from the convergence determination unit 64, the propagator 56 supplies the same sample signal to the neural network 20 to perform the processing again.

Figure 4:
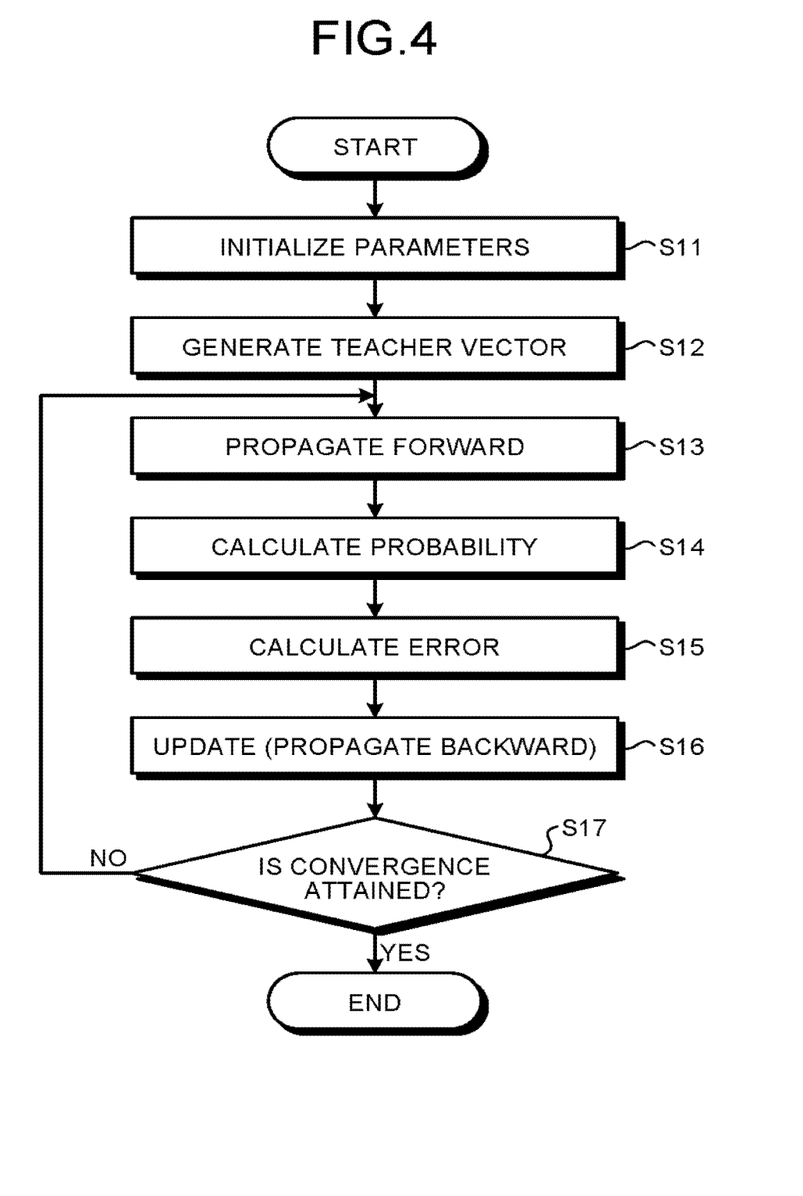
FIG. 4 is a diagram illustrating a processing procedure of the training device.

FIG. 4 is a diagram illustrating the processing procedure of the training device 30. The training device 30 performs the processing according to the procedure illustrated in FIG. 4.

First, the training device 30 initializes the parameters of the neural network 20 (S11). Subsequently, the converter 54 generates the teacher vector including the (N+1) target values $r'_1, r'_2, \ldots, r'_N, r'_{N+1}$ from the pre-conversion teacher vector including the N target values $r_1, r_2, \ldots, r_N$ (S12).

Subsequently, the propagator 56 propagates the sample signal in the forward direction from the input layer of the neural network 20. The propagator 56 outputs the input vector including the (N+1) input values $x_1, x_2, \ldots, x_N, x_{N+1}$ (S13).

Subsequently, the probability calculator 58 supplies the respective input values $x_1, x_2, \ldots, x_N, x_{N+1}$ included in the input vector to the softmax function to generate the (N+1) probability values $y'_1, y'_2, \ldots, y'_N, y'_{N+1}$ (S14). Subsequently, the error calculator 60 calculates the cross-entropy error E between the teacher vector including the (N+1) target values $r'_1, r'_2, \ldots, r'_N, r'_{N+1}$ and the probability vector including the (N+1) probability values $y'_1, y'_2, \ldots, y'_N, y'_{N+1}$ (S15).

Subsequently, the updater 62 propagates the error E in the reverse direction from the output layer 44 of the neural network 20 to update the parameters at the respective layers of the neural network 20 so as to reduce the error E (S16). Subsequently, the convergence determination unit 64 determines whether the updated parameters have converged as a result of the update of the parameters (S17). If they are determined to have converged (Yes at S17), the convergence determination unit 64 ends the current procedure. If they are not determined to have converged (No at S17), the convergence determination unit 64 returns the process to the step S13 so that the process is repeated from the step S13.

The training device 30 described above can train the neural network 20 so as to output the posterior probabilities that the input signal belongs to the particular classes at a lower computational cost.

The neural network 20 according to the present embodiment can be used not only in the speech detection device, but also in other devices. For example, the neural network 20 according to the present embodiment can also be used, for example, in devices for determining whether an input image includes a particular object and in devices for evaluating an occurrence probability of a particular word in an input context.

Function used at output layer 44 of neural network 20

The following describes the function used at the output layer 44 of the neural network 20.

A conventional neural network that performs n-class classification usually has the same number of units at the output layer as the number of classes N, and outputs an output vector including elements of N dimensions. When an input signal o is supplied to such a neural network, the c-th element $y_c$ ($1 \le c \le N$) of the N-dimensional output vector represents a posterior probability $p(c|o)$ that the input signal o belongs to the c-th class.

In general, the softmax function represented by Expression (41) below is used as an activation function at the output layer of the neural network. The softmax function is a function that applies an exponential to the input vector on an element-by-element basis to normalize the sum of the output values for each element.

$$\bar{y} = \text{softmax}(\bar{x}) \quad (41)$$

$$\bar{y} = [y_1, y_2, y_3, \ldots, y_N]^T$$

$$\bar{x} = [x_1, x_2, x_3, \ldots, x_N]^T$$

$$y_i = \frac{\exp x_i}{Z(x)} \quad (1 \le i \le N)$$

$$Z(x) = \sum_{i=1}^{N} \exp x_i$$

In general, the neural network that uses the softmax function at the output layer performs training with the error back-propagation method using the cross-entropy error as an objective function. The cross-entropy error is represented by Expression (42) below.

$$E = H(\bar{r}, \bar{y}) \quad (42)$$

$$H(\bar{r}, \bar{y}) = -\sum_{i=1}^{N} r_i \log y_i$$

$$\bar{r} = [r_1, r_2, r_3, \ldots, r_N]^T$$

The symbol r in Expression (42) represents the teacher vector. A vector obtained by 1-of-k encoding is used as the teacher vector r in many cases.

Based on Expression (41), the logarithmic posterior probability $\log p(c|o)$ that the input signal belongs to the c-th class is represented as Expression (43) below.

$$\log p(c|o) = \log y_c = x_c - \log Z(x) \quad (43)$$

All the elements included in the output vector do not need to be necessarily calculated depending on the purpose of using the neural network. In some cases, the logarithmic posterior probability $\log p(c|o)$ is calculated for the particular c-th class. Examples of such cases include, but are not limited to, a case where a determination is to be made whether an input image includes a particular object, a case where a determination is to be made whether an input speech includes a particular keyword, and a case where an occurrence probability of a particular word in an input context is to be evaluated.

However, even in the case of calculating the logarithmic posterior probability $\log p(c|o)$ for the particular c-th class, Expression (43) requires calculation of $\log Z(x)$ serving as a term for normalization by use of all the elements of the N-dimensional input vector. Consequently, the computational cost increases when N is large.

The conventional neural network that performs n-class classification includes N units at the output layer. However, in the following description, the training is performed on a neural network that includes N units respectively corresponding to the N classes and an additional unit corresponding to an estimated value of $\log Z(x)$ at the output layer. At the output layer, the index of a unit corresponding to the c-th class is assumed to be c, and the index of the additional unit corresponding to the estimated value of $\log Z(x)$ is assumed to be N+1.

In the neural network including the (N+1) units at the output layer, an (N+1) dimensional vector represented by Expression (44) below is expected to be supplied to the function.

$$\bar{x}' \approx [x_1, x_2, x_3, \ldots, x_N, \log Z(x)]^T \quad (44)$$

When the input vector represented by Expression (44) is supplied to the softmax function, a vector represented by Expression (45) below is expected to be output.

$$\bar{y}' = \text{softmax}(\bar{x}') \quad (45)$$

$$\approx \frac{1}{\sum_{i=1}^{N} \exp x_i + z(x)} [\exp x_1, \exp x_2, \exp x_3, \ldots, \exp x_N, Z(x)]^T$$

$$= \frac{1}{2Z(x)} [\exp x_1, \exp x_2, \exp x_3, \ldots, \exp x_N, Z(x)]^T$$

$$= \left[\frac{1}{2}y_1, \frac{1}{2}y_2, \frac{1}{2}y_3, \ldots, \frac{1}{2}y_N, \frac{1}{2}\right]^T$$

Accordingly, using the teacher vector represented by Expression (46) below can cause the neural network to train to output the vector represented by Expression (45).

$$\bar{r}' = \left[\frac{1}{2}r_1, \frac{1}{2}r_2, \frac{1}{2}r_3, \ldots, \frac{1}{2}r_N, \frac{1}{2}\right]^T \quad (46)$$

$$= \left[0, 0, \ldots, \frac{1}{2}, \ldots, 0, \frac{1}{2}\right]^T$$

The first to N-th elements of the teacher vector represented by Expression (46) vary depending on the sample signal. However, the (N+1)st element of the teacher vector represented by Expression (46) is a constant value (=½) for all sample signals.

Consequently, the training device 30 can train the estimated value of the regularization term ($\log Z(x)$) by setting the element corresponding to the additional unit at the output layer to the constant value (=½). The neural network that has performed the training using the teacher vector represented by Expression (46) can generate the input vector including the (N+1) input values as represented by Expression (44).

As a result of the above, the neural network 20 according to the present embodiment can calculate the estimated value of the logarithmic posterior probability $\log p(c|o)$ of the c-th class as represented by Expression (47) below.

$$\log p(c|o) = x_c - \log Z(x) \quad (47)$$

$$\approx x_c - x_{N+1}$$

The estimated value of the logarithmic posterior probability is calculated by Expression (47) using only two elements among those of the input vector. Consequently, the neural network 20 according to the present embodiment can calculate the logarithmic posterior probability that the input signal belongs to the particular class at a lower cost.

The following further describes the method for estimating the logarithmic posterior probability that the input signal belongs to the particular class by use of the neural network 20 that has trained by the training device 30.

The layer immediately preceding the output layer 44 outputs the vector including the M elements $o_1, o_2, \ldots, o_M$. The parameters at the output layer 44 include those of the matrix of (N+1) rows×M columns including the weights w, and the (N+1) biases b.

In this case, the input vector supplied to the function used at the output layer 44 is represented by Expression (51) below.

$$\bar{x} = \overline{W}\bar{o} + \bar{b} \qquad (51)$$

The function used at the output layer 44 of the neural network 20 is represented by Expression (47) described above. The input vector represented by Expression (51) is substituted into the function of Expression (47) to deform Expression (47) into Expression (52) below.

$$\log p(c|o) \approx x_c - x_{N+1} \qquad (52)$$
$$= (\overline{w_c}\bar{o} + b_c) - (\overline{w_{N+1}}\bar{o} + b_{N+1})$$
$$= (\overline{w_c} - \overline{w_{N+1}})\bar{o} + (b_c - b_{N+1})$$

Consequently, the neural network 20 according to the present embodiment can calculate the estimated value of the logarithmic posterior probability of the c-th class by performing calculation of Expression (52) at the output layer 44. When the estimated value of the logarithmic posterior probability needs to be calculated for only some of the N classes, the neural network 20 does not need to store parameters corresponding to classes for which the estimated value of the logarithmic posterior probability does not need to be calculated among the weights w and the biases b obtained by the training. This can reduce the memory size of the neural network 20.

A vector of differences in weight is represented by Expression (53) below. A vector of differences in bias is represented by Expression (54).

$$W' = \begin{bmatrix} w'_{1,1} & \cdots & w'_{1,M} \\ \vdots & \ddots & \vdots \\ w'_{N,1} & \cdots & w'_{N,M} \end{bmatrix} \qquad (53)$$

$$\overline{W}_c = \begin{bmatrix} w'_{c,1} \\ w'_{c,2} \\ w'_{c,3} \\ \vdots \\ w'_{c,M} \end{bmatrix}^T = \begin{bmatrix} w_{c,1} - w_{N+1,1} \\ w_{c,2} - w_{N+1,2} \\ w_{c,3} - w_{N+1,3} \\ \vdots \\ w_{c,M} - w_{N+1,M} \end{bmatrix}^T$$

$$\bar{b}' = [b'_1, b'_2, b'_3, \ldots, b'_N]^T \qquad (54)$$
$$= [b_1 - b_{N+1}, b_2 - b_{N+1}, b_3 - b_{N+1}, \ldots, b_N - b_{N+1}]^T$$

The vector of differences in weight represented by Expression (53) can be calculated after the training is finished. The vector of differences in bias represented by Expression (54) can also be calculated after the training.

Accordingly, the neural network 20 can perform calculation of Expression (55) below at the output layer 44 to calculate the estimated value of the logarithmic posterior probability of the c-th class by storing in advance the vector of differences in weight represented by Expression (53) and the vector of differences in bias represented by Expression (54) that have been calculated after the training.

$$\bar{y} \approx \overline{w}'\bar{o} + \bar{b}' \qquad (55)$$

The neural network 20 described above performs the calculation of Expression (55) to calculate the estimated value of the logarithmic posterior probability. Thereby, the computational cost and the memory size during the classification can be reduced.

Hardware Configuration

Figure 5:
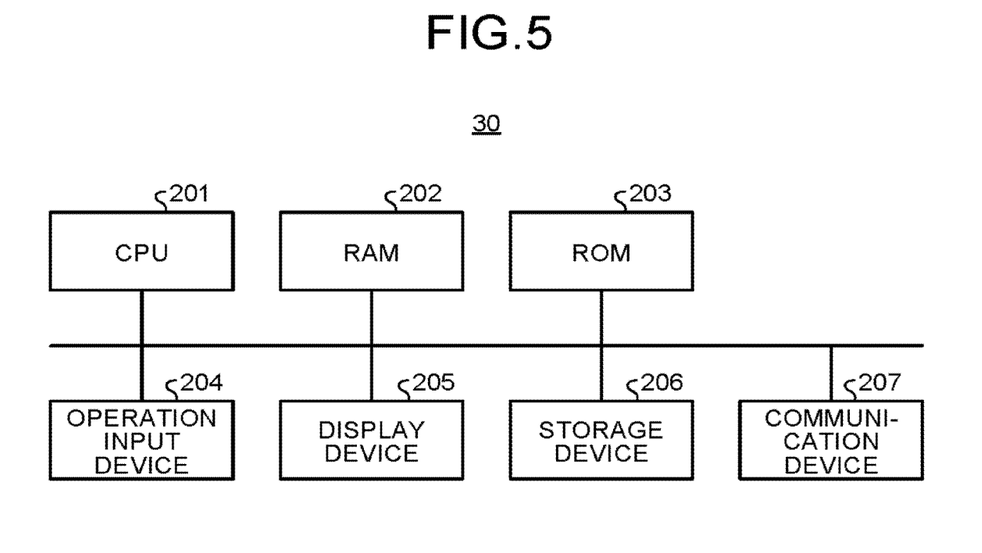
FIG. 5 is a diagram illustrating a hardware configuration of the training device.

FIG. 5 is a diagram illustrating an example of the hardware configuration of the training device 30 according to the embodiment. The training device 30 according to the present embodiment is implemented, for example, by an information processing device having the hardware configuration illustrated in FIG. 5. This information processing device includes a central processing unit (CPU) 201, a random access memory (RAM) 202, a read-only memory (ROM) 203, an operation input device 204, a display device 205, a storage device 206, and a communication device 207. These units and devices are connected together through a bus.

The CPU 201 is a processor that performs, for example, calculation processing and control processing according to a program. The CPU 201 performs various types of processing in cooperation with programs stored, for example, in the ROM 203 and the storage device 206, using a predetermined region in the RAM 202 as a working area.

The RAM 202 is a memory, such as a synchronous dynamic random access memory (SDRAM). The RAM 202 serves as the work area of the CPU 201. The ROM 203 is a memory that stores the programs and various types of information in an unrewritable manner.

The operation input device 204 is an input device including, for example, a mouse and a keyboard. The operation input device 204 receives information operationally entered by a user as an instruction signal, and outputs the instruction signal to the CPU 201.

The display device 205 is a display device, such as a liquid crystal display (LCD). The display device 205 displays various types of information based on display signals from the CPU 201.

The storage device 206 is a device that writes and reads data to and from, for example, a semiconductor-based recording medium, such as a flash memory, or a recording medium capable of magnetic or optical recording. The storage device 206 writes and reads the data to and from the recording medium according to control by the CPU 201. The communication device 207 communicates with external equipment through a network according to control by the CPU 201.

The program executed by the training device 30 of the present embodiment has a modular structure, including a conversion module, a propagation module, a probability calculation module, an error calculation module, an update module, and a convergence determination module. The CPU 201 (processor) loads the program into the RAM 202, and executes the program to cause the information processing device to function as the converter 54, the propagator 56, the probability calculator 58, the error calculator 60, the updater 62, and the convergence determination unit 64.

The training device 30 is not limited to having such as configuration, but may have a configuration in which at least one of the converter 54, the propagator 56, the probability calculator 58, the error calculator 60, the updater 62, and the convergence determination unit 64 is implemented by a hardware circuit (such as a semiconductor integrated circuit).

The program executed by the training device 30 of the present embodiment is provided by being recorded as a file in a computer-installable or computer-executable format on a computer-readable recording medium, such as a compact disc read-only memory (CD-ROM), a flexible disk, a compact disc recordable (CD-R), or a digital versatile disc (DVD).

The program executed by the training device 30 of the present embodiment may be stored on a computer connected to a network, such as the Internet, and provided by being downloaded through the network. The program executed by the training device 30 of the present embodiment may be provided or distributed through a network, such as the Internet. The program executed by the training device 30 may be provided by being incorporated in advance in, for example, the ROM 203.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A training device comprising:
   circuitry configured to train a neural network that outputs a posterior probability that an input signal belongs to a particular class of a plurality of classes, wherein
   an output layer of the neural network includes N units each respectively corresponding to one of the plurality of classes, N being an integer of 2 or larger, N units receiving the respective inputs and generating the respective outputs,
   the output layer includes one additional unit, the one additional unit receiving the respective input without generating the respective output,
   the circuitry is configured to:
      supply a sample signal known in advance to belong to the particular class to the neural network;
      acquire, for each of the units at the output layer, (N+1) input values that are obtained by connecting signals output from a layer immediately preceding the output layer according to a set parameter;
      supply the input values to a function for calculating the posterior probability to generate a probability vector including (N+1) probability values respectively corresponding to the units at the output layer; and
      update a parameter included in the neural network in such a manner to reduce an error between a teacher vector and the probability vector,
   the teacher vector includes (N+1) target values respectively corresponding to the units at the output layer, and
   a target value in the teacher vector corresponding to the additional unit is a predetermined constant value.

2. The training device according to claim 1, wherein the target values respectively corresponding to the plurality of classes each are a value based on a probability that the sample signal belongs to the particular class.

3. The training device according to claim 2, wherein
   each of the target values is 0 or larger,
   a sum of all the target values is 1, and
   the target value corresponding to the additional unit is ½.

4. The training device according to claim 3, wherein
   a target value corresponding to the particular class is ½,
   the target value corresponding to the additional unit is ½, and
   the other target values are 0.

5. The training device according to claim 1, wherein the circuitry is configured to propagate the sample signal in a forward direction from an input layer of the neural network.

6. The training device according to claim 5, wherein the circuitry is configured to propagate the error in a reverse direction from the output layer of the neural network to update parameters at respective layers so as to reduce the error.

7. The training device according to claim 1, wherein the circuitry configured to calculate the error between the teacher vector and the probability vector.

8. The training device according to claim 7, wherein the circuitry is configured to supply the input values to a softmax function to generate the probability vector including the (N+1) probability values.

9. The training device according to claim 8, wherein the circuitry is configured to calculate a cross-entropy error.

10. The training device according to claim 9, wherein each of the units at the output layer of the neural network calculates a probability value of the posterior probability that the input signal belongs to a class corresponding to the respective unit by subtracting an input value corresponding to the additional unit from an input value corresponding to the respective unit.

11. The training device according to claim 1, wherein the circuitry is configured to:
   read a pre-conversion teacher vector including N target values from a storage, and
   convert the pre-conversion teacher vector to the teacher vector including N+1 target values.

12. The training device according to claim 1, wherein the circuitry is configured to:
   read a pre-conversion teacher vector including N target values from a storage; and
   convert the pre-conversion teacher vector into the teacher vector including N+1 target values, and
   in the pre-conversion teacher vector:
      a target value corresponding to the particular class is 1, and
      the other target values are 0.

13. A speech detection device configured to detect, from a speech signal, a part of the speech signal similar to a specified search pattern, the speech detection device comprising:
   circuitry configured to:
      convert the speech signal into a speech parameter sequence;
      use the neural network to calculate a score representing likelihood of occurrence of each speech parameter included in the speech parameter sequence in the specified search pattern; and
      detect, based on the score, whether the speech signal includes the specified search pattern, and
   the training device according to claim 1.

14. A training method comprising:
training a neural network that outputs a posterior probability that an input signal belongs to a particular class of a plurality of classes, wherein
an output layer of the neural network includes N units each respectively corresponding to one of the plurality of classes, N being an integer of 2 or larger, N units receiving the respective inputs and generating the respective outputs,
the output layer includes one additional unit, the one additional unit receiving the respective input without generating the respective output,
the training comprises:
  supplying a sample signal known in advance to belong to the particular class to the neural network;
  acquiring, for each of the units at the output layer, (N+1) input values that are obtained by connecting signals output from a layer immediately preceding the output layer according to a set parameter;
  supplying the input values to a function for calculating the posterior probability to generate a probability vector including (N+1) probability values respectively corresponding to the units at the output layer; and
  updating a parameter included in the neural network in such a manner to reduce an error between a teacher vector and the probability vector, the teacher vector including (N+1) target values respectively corresponding to the units at the output layer, wherein
a target value in the teacher vector corresponding to the additional unit is a predetermined constant value.

15. A computer program product comprising a non-transitory computer readable medium including a computer program causing an information processing device to function as a training device configured to:
train a neural network that outputs a posterior probability that an input signal belongs to a particular class of a plurality of classes, wherein
an output layer of the neural network includes N units each respectively corresponding to one of the plurality of classes, N being an integer of 2 or larger, N units receiving the respective inputs and generating the respective outputs,
the output layer includes one additional unit, the one additional unit receiving the respective input without generating the respective output,
the computer program causes the information processing device to function as:
  a propagator configured to supply a sample signal known in advance to belong to the particular class to the neural network, and to acquire, for each of the units at the output layer, (N+1) input values that are obtained by connecting signals output from a layer immediately preceding the output layer according to a set parameter;
  a probability calculator configured to supply the input values to a function for calculating the posterior probability to generate a probability vector including (N+1) probability values respectively corresponding to the units at the output layer; and
  an updater configured to update a parameter included in the neural network in such a manner to reduce an error between a teacher vector and the probability vector, the teacher vector including (N+1) target values respectively corresponding to the units at the output layer, and
a target value in the teacher vector corresponding to the additional unit is a predetermined constant value.

* * * * *